United States Patent [19]
Nichols
[11] 3,846,642
[45] Nov. 5, 1974

[54] SYNCHRONIZED IMAGE INTENSIFIER GATING

[75] Inventor: Donald Nichols, Alexandria, Va.

[73] Assignee: The United States of America as represented by the Secretary of the Army, Washington, D.C.

[22] Filed: Dec. 7, 1973

[21] Appl. No.: 423,046

[52] U.S. Cl. .............. 307/239, 250/213 R, 328/109
[51] Int. Cl. .......................................... H03k 17/00
[58] Field of Search ........... 328/109, 129; 307/232, 307/234; 250/213, 556

[56] References Cited

UNITED STATES PATENTS 2,740,091 3/1956 Goulding .......................... 328/109
3,689,770 9/1972 Dion .............................. 250/213 R
3,790,785 2/1974 Paolini et al. ................. 250/213 R

*Primary Examiner*—Rudolph V. Rolinec
*Assistant Examiner*—B. P. Davis
*Attorney, Agent, or Firm*—Edward J. Kelly; Herbert Berl; T. Major

[57] ABSTRACT

An image intensifier gating device utilizing a stable high frequency clock, digital counting circuit, memory, subtractor, comparator and control logic to predict a next pulse in a regular pulse train; and a delay switch to account for the delays in the system to provide a gating signal in sufficient time to activate the gate and observe the next pulse.

7 Claims, 1 Drawing Figure

PATENTED NOV 5 1974 3,846,642
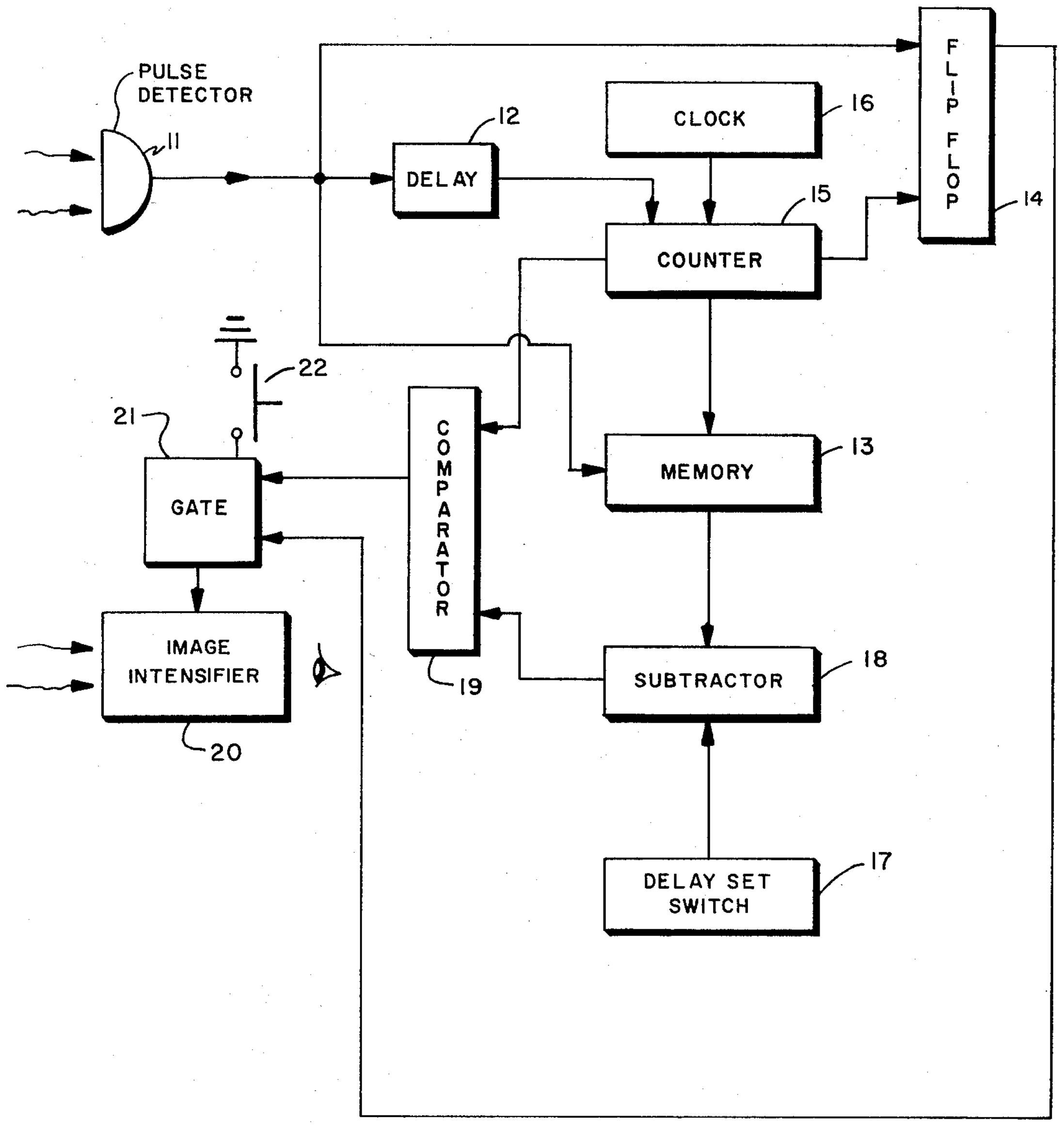

SYNCHRONIZED IMAGE INTENSIFIER GATING

The invention described herein may be manufactured, used, and licensed by or for the Government for governmental purposes without the payment to me of any royalty thereon.

FIELD OF THE INVENTION

The instant invention is related to a gating mechanism associated with an image intensification device. It operates to detect a regular series of narrow width pulses, predict an incoming pulse and turn on the image intensifier synchronously therewith.

Prior art gated image intensifiers, utilizing the leading edge of a sufficiently wide light pulse to trigger the gate, could either provide a window for the incoming pulse or turn off the image intensifier tube to avoid excessive glare from the pulse. But the delays inherent in the light pulse detector and the gating circuit made it impossible to detect and view pulses of very narrow width.

SUMMARY OF THE INVENTION

The invention disclosed herein solves the problems of the prior art device by predicting the arrival of an incoming light pulse and providing an active gate control which turns on the image intensifier at a time calculated to frame the predicted light pulse. The invention utilizes logic circuitry and a free running clock to provide a measure of the input light pulse spacing detected by the pulse detector. By applying a timing delay to provide for the accountable internal delays of the circuitry, an appropriately timed signal turns on the gate in time to permit the image intensifier to view an incoming light pulse.

BRIEF DESCRIPTION OF THE DRAWING

The FIGURE shown is a system diagram of the disclosed invention.

DESCRIPTION OF THE PREFERRED EMBODIMENT

The physical arrangement of the components of the system will be described first; and a description of the operation presented thereafter.

Referring to the FIGURE, a pulse detector 11 receives incoming light pulses. Typically, it would comprise appropriate amplifiers and shaping circuits as is known to the art to produce a pulse level adequate to operate the logic to which the incoming pulses are applied. A delay 12, a memory 13 and a flip-flop 14 are all directly connected to receive pulse outputs from the pulse detector 11. A counter 15 such as an 18 bit binary counter is connected to the delay 12 to receive inputs therefrom. A free running clock 16, as for example, a one megahertz crystal stabilized clock drives the counter 15 which in turn provides input to the memory 13. Information from the memory 13 and from a delay switch device 17 are fed into a subtractor 18 which feeds its output to a comparator 19. The comparator 19 also receives an input signal from the counter 15 which it compares with the output from the subtractor. The output of the comparator is used to turn on the image intensifier 20 by activating the gate 21 to permit the image intensifier to see the incoming pulse predicted by the above described system. The physical arrangement having been described, the sequence of functions will now be related so that the operation of the system may be understood.

As previously stated, the system is intended to work from a series of regularly spaced input light pulses as might be generated by a pulsed laser.

The light pulses are received by the pulse detector 11. The first pulse signal out of the detector does three things: first it resets the flip-flop 14 which determines the passive or active state of the viewer; secondly, it provides an enabling pulse to the memory 13 thereby setting a random counter number in it; lastly, a pulse delayed by the delay device 12 resets the counter to zero; which immediately begins counting upward again. Typically this would be in one microsecond steps if the clock 16 driving the counter is a one megahertz clock as noted above. Upon receipt of a second pulse in the light pulse train, the memory 13 will be enabled to accept the count information then in the counter 15. Again, because of the delay 12 the counter will be reset shortly thereafter and start its upward count. The output of memory 13 is fed to the subtractor 18 which also receives an input from the delay switch device 17. The latter input is an empirical factor determined by the delays of the particular pulse detector, gating circuitry, etc. of this device. This factor is subtracted from the count from the memory 13 by the subtractor 18. This difference provides an input to the comparator 19; which input is the interval between the first two pulses minus the empirical setting on the delay switch device 17. Now when the comparator 19 (being fed by the counter 15) reaches the same number as that number out of the subtractor 18, the comparator 19, having these inputs from the subtractor 18 and counter 15, produces an output pulse which is provided to the high voltage gate 21 thereby turning on the image intensifier tube 20. The tube 20 is then turned off a short time later by an internal delay provided in the gate 21. At the present time, practice is to set this time delay at 15 microseconds; but this period could be made longer or shorter as would be appropriate for the particular conditions. In conjunction with the 15 microsecond pulse-width of the gate, the delay switch device 17 would be set to gate the intensifier on about 7 microseconds before the predicted arrival time of the third pulse.

The arrival of third light pulse through the detector 11 will again load the information then present in the counter 15 into the memory 13 and then reset the counter 15; which will start counting to repeat the described cycle. In summary then, each pulse is predicted according to the time interval between the two preceding input pulses.

Assuming for the presently disclosed device that the counter, memory, subtractor and comparator are 18 units, the flip-flop 14 is reset by the last bit from the counter; which reset will not occur as long as there is a regular pulse arriving at intervals that are appropriate short. Note, however, that the counter 15 may consist of more bits than the other logic elements to prevent unstable operation at the lowest pulse repetition rates anticipated. But if the input light pulses cease, the 18 bit counter will continue to count all the way to full and then through full to zero. As it passes from full to zero, a pulse is delivered to the reset line of the flip-flop 14 that determines the passive or active mode of operation. Flip-flop 14 then controls a relay or logic in the gate 21; so that as long as it is in a reset state, the gate will remain in a passive on condition. Upon receipt of the first pulse the gate switches to an active off condition and is then pulsed on by the output from the comparator 19 as described above. This allows viewing of the surrounding area in the passive mode while searching to locate a repetitive light pulse source. In the absence of this pulse, the device remains in the passive on mode. Presence of a repetitive pulse source is indicated by the loss of the background scene as the viewer is set to the active off mode. The pulse itself or the target and quite often the beam of the illuminator or designator, will be visible in the active mode. If it is desired to see the surrounding areas or background in order to exactly locate the designator in relation to its surroundings, an extra control, in the form of a passive override push button 22, can be provided to return the gate to the passive on mode for as long as the button is depressed. Upon release of the passive override button the device returns to the active mode if a repetitive pulse source is still present. If not, it remains in the passive mode.

While only one embodiment of the invention has been disclosed, it is to be understood that many variations, substitutions and alterations may be made while remaining within the spirit and scope of the invention which is limited only by the following claims.

I claim:

1. A gating control device for predicting an incoming pulse of a pulse train to an image intensifier having a gate and for turning on said image intensifier, comprising:

- pulse detection means;
- means for determining the interval between successive pulses;
- means for storing an empirical value representative of the internal delays of the circuitry of said gating control device;
- means for determining the difference between said interval and said empirical value; and
- means for comparing said difference with the interval to a next succeeding incoming pulse and for providing a gating pulse to said gate when these values are equal, thereby turning on the image intensifier in time to observe the predicted incoming pulse.

2. The gating control according to claim 1 wherein said means for determining the interval between successive pulses comprise a counter driven by a clock, and a memory receiving its input from said counter, and wherein activating pulses are received by said counter and memory from said pulse detector.

3. The gating control according to claim 2 wherein a delay device is interposed between said pulse detector and said counter thereby permitting said counter to be reset to count upward immediately after the memory accepts an input from the counter.

4. The gating control according to claim 3 further including a flip-flop receiving inputs from the pulse detector and the counter for controlling the active or passive mode of said image intensifier with an output to said gate.

5. The gating control according to claim 4 further including override means whereby the intensifier may be placed in a passive viewing state for scanning purposes for as long as the override means are activated.

6. A gating control device for viewing pulses of an incoming pulse train to an image intensifier having a gate and comprising:

- pulse detection means;
- means for determining the interval between successive pulses, further comprising;
  - a subtractor;
  - a memory triggered by said pulse detection means providing inputs to said subtractor;
  - a counter driven by a clock and providing inputs to said memory, and being reset by pulses from said pulse detection means;
  - delay means interposed between said counter and pulse detection means for causing said counter to be reset immediately after the memory receives an input from the counter;
- means for providing an empirical value to said subtractor that is determined by the internal delays of the circuitry of said device; and
- a comparator receiving inputs from said subtractor and said counter for providing a gating on signal to the gate of the image intensifier when the input from the counter equals the difference output from the subtractor.

7. The device of claim 6 further including a flip-flop between said counter and said gate for placing said device in a passive on viewing mode whenever the counter passes from its maximum count to zero without being reset by an incoming pulse.

* * * * *